United States Patent [19]
Bürge et al.

[11] Patent Number: 5,560,774
[45] Date of Patent: Oct. 1, 1996

[54] PROCESS FOR ACCELERATING THE SETTING AND HARDENING OF MATERIAL WHICH CONTAINS A HYDRAULIC BINDER, SETTING AND HARDENING ACCELERATOR AND USE OF A MIXTURE FOR ACCELERATING THE SETTING AND HARDENING

[75] Inventors: Theodor A. Bürge, Geroldswil; Klemens Bösch, Dietikon; Dieter Mai, Bilten, all of Switzerland

[73] Assignee: Sika AG, vorm. Kaspar Winkler & Co., Switzerland

[21] Appl. No.: 354,144

[22] Filed: Dec. 6, 1994

[30] Foreign Application Priority Data

Dec. 6, 1993 [CH] Switzerland ............... 3627/93

[51] Int. Cl.$^6$ ..................................... C04B 22/08
[52] U.S. Cl. ............... 106/692; 106/696; 106/736; 106/740; 106/819; 427/427
[58] Field of Search ............ 427/427; 106/696, 106/692, 693, 819, 736, 740

[56] References Cited

U.S. PATENT DOCUMENTS 4,957,556  9/1990  Kunbargi ................. 106/693

FOREIGN PATENT DOCUMENTS

| 408060 | 3/1910 | France . |
| 2031950 | 11/1970 | France . |
| 3037145 | 2/1991 | Japan . |
| 1350136 | 11/1987 | U.S.S.R. . |

*Primary Examiner*—Paul Marcantoni
*Attorney, Agent, or Firm*—Burns, Doane, Swecker & Mathis

[57] ABSTRACT

In a process for accelerating the setting and hardening of a material which contains a hydraulic binder or which consists of a hydraulic binder there is used a setting accelerator mixture which is free of alkali metals and free of chlorides. Said setting accelerating mixture contains at least one water soluble sulfate of a polyvalent cation and a further constituent which is selected from the group consisting of calcium aluminate, calcium sulfoaluminate, basic aluminum salts, mixtures thereof or mixtures containing at least one of said constituents and a further component. If the water soluble sulfate of the polyvalent cation is aluminum sulfate, then said compound has to contain crystal water in order to provide the water solubility of said product. With the setting accelerating mixtures, a fast gaining of strength of a corresponding mortar or concrete is achieved and the finally hardened product has better mechanical characteristics then corresponding products prepared without the adding of any set accelerating admixture.

26 Claims, No Drawings

PROCESS FOR ACCELERATING THE SETTING AND HARDENING OF MATERIAL WHICH CONTAINS A HYDRAULIC BINDER, SETTING AND HARDENING ACCELERATOR AND USE OF A MIXTURE FOR ACCELERATING THE SETTING AND HARDENING

The present invention concerns a process for accelerating the setting and hardening of a material which contains a hydraulic binder or a latent hydraulic binder or which consists of a binder with or without a latent hydraulic binder by adding a mixture which contains at least one component which is selected from the group consisting of calcium aluminate, calcium sulfoaluminate and basic aluminum salts. The set accelerating mixtures are free of chlorides and free of alkali metal ions.

BACKGROUND OF THE INVENTION

It is well known in the art that the setting and hardening of a hydraulic binder or of a mixture which contains a hydraulic binder can be accelerated through the adding of a setting accelerator or hardening accelerator. Typical examples of binders are cement, like Portland cement, lime, slake limes, gypsum and mixtures thereof and typical examples of mixtures which contain such a binder and further components are mortar and concrete.

The most commonly used setting accelerators however are substances with strongly alkaline properties, like alkali metal hydroxides, alkali metal carbonates, alkali metal silicates and alkali metal aluminates. Substances with strongly alkaline properties however are undesired due to health risks which they can cause when persons are handling such substances, and specially etching of the skin of the worker, harmful effects onto the respiratory system, specially the lungs, and irritation of the eyes and even an etching of the cornea can occur.

Furthermore the introduction of alkali metal ions into mortar or concrete has an adverse effect onto the properties of the construction material. For example, through the incorporation of strongly alkaline setting accelerators into concrete, the final compressive strength of the hardened construction material is lowered, and the shrinkage is increased, which may result in the development of cracks in the construction material. Thus the stability and the lasting quality and durability of the building is deteriorated.

A further group of frequently used setting accelerators and hardening accelerators contains chlorides like alkaline earth metal chlorides. Any chloride containing materials however are undesired at a construction site because they have a corrosive effect onto the different equipments used at the construction site and also the corrosion of reinforcing bars and nets is increased through chloride ions.

Furthermore it is well known in the art that any set accelerators which contain chlorides reduce the chemical resistance of the construction material drastically, specially the sulfate resistance of the hardened cement or concrete.

DESCRIPTION OF THE PRIOR ART

In the European patent publication EP 181 739 A1, there is described that a slurry which contains 250% of water can be hardened by using calcium sulfoaluminate and a mixture of calcium aluminate together with alkali metal compounds and alkaline earth metal compounds.

In the Japanese patent application 63 206 341 (see Chemical Abstracts vol. 110, no. 2, Jan. 9, 1989, Columbus, Ohio, US, abstract no. 12627n), there is described a hardening accelerator for cement which comprises certain amounts of calcium aluminate or calcium sulfoaluminate together with alkali metal aluminates and alkali metal carbonates and furthermore with a calcinated alunite.

In the Japanese patent publication JP 03 037 145 (see Chemical Abstracts, vol. 115, no. 12, Sep. 23, 1991, Columbus, Ohio, US, abstract no. 119145j), there are described rapid-setting agents for cement, which contain alkali metal aluminate, alkali metal carbonate, calcium aluminate, aluminum sulfate, as well as alkanol amine.

The Japanese patent publication JP 01 298 050 (see Chemical Abstracts, vol. 113, no. 14, Oct. 1, 1990, Columbus, Ohio, US, abstract no. 119976q), describes a rapid setting agent for cement which is effective at low temperatures and which can be used in a shotcrete process. Said agent contains alkali aluminate, alkali carbonate, calcium aluminate and aluminum sulfate. Preferred alkali metal components of said mixture are the sodium salts.

The Japanese patent publication JP 01 290 543 A2 discloses the accelerating of the hardening at low temperatures by using a mixture of calcium sulfoaluminate, calcium sulfate and lithium carbonate.

The setting accelerators which are described in the above stated publications however have the disadvantages which are caused through the incorporation of alkali metal ions into mortar and concrete.

Some hardening accelerators described in the prior art contain aluminum hydroxide or aluminum oxide. Setting accelerators which contain amorphous aluminum hydroxide, preferably aluminum hydroxide having an average particle size of 4,8 to 5,4 μm are described in the European patent 0 262 262 and also in Chemical Abstracts, vol. 86, no. 18, May 1977, page 300, abstract no. 126087c.

The German Auslegeschrift DE-A-2 548 687 describes a setting accelerator based on aluminate and aluminumoxide which furthermore contains aluminum sulfate or nitrate.

Also in the European patent 0 076 927 there is described a setting accelerator based on amorphous aluminum hydroxide which furthermore contains water soluble sulfates, nitrates or formiates.

According to French patent publication Fr A 2471 955, formiates and nitrates can be used in set accelerating mixtures.

In as far as the hardening of gypsum is concerned the Japanese patent publication JP 54 026 817 describes an acceleration of the setting through the addition of calcium sulfoaluminate and also in the Japanese patent publication JP 58 190 849 A2 there is described that fast setting sprayable coating materials can be prepared by adding a mixture of calcium sulfoaluminate, calcium sulfate hemihydrate and calcium hydroxide.

The Russian patent SU 697 427 describes an accelerating of the setting of cements which is caused through the adding of calcium aluminate, calcium sulfoaluminate, calcium oxide, ferrite, silicate and gypsum. Also the Russian patent SU 1 350 136 A1 describes a set acceleration of cement klinkers which can be achieved through adding barium sulfate, calcium aluminate and calcium sulfoaluminate.

The German patent Offenlegungsschrift 2 163 604 describes a setting accelerator based on calcium fluoroaluminate and the Japanese patent publication JP 53 099 228 refers to accelerators for cast mortar based on calcium fluoroaluminate, calcium sulfoaluminate and water reducing agents.

In the Japanese patent 03 012 350 (see Chemical Abstracts, vol. 114, no. 20, May 20, 1991, Columbus, Ohio, US, abstract no. 191335t), there is described a rapid setting cement composition which comprises a mixture of the components (a) calcium aluminate+gypsum and (b) sulfates of monovalent and trivalent metals and carboxylic acids.

Furthermore, also setting accelerators which contain sulfates of divalent or trivalent cations are already described in the art. For instance, in the Japanese patent publication JP 03 083 841 (see Chemical Abstracts vol. 115, no. 14, October 7, 1991, Columbus, Ohio, US, abstract no. 141366d), there is described a setting accelerator which is mainly used in order to achieve a rapid setting of spray concrete and said accelerator consists mainly of magnesium sulfate.

In the French patent 408 060 there is disclosed that the setting of cement containing mixtures, specially Portland cement, can be accelerated through adding iron sulfates. From said patent, however, it cannot be seen whether sulfates of divalent or trivalent iron had been added.

Aluminum sulfate which is free of crystal water, like calcinated aluminum sulfate, has already been used either alone or in combination with other constituents which have a set accelerating activity, in order to provide a rapid setting and hardening of mixtures which comprise cement, like concrete compositions. With regard to this we refer to the Czech patent CS 257 142 (see Chemical Abstracts, vol. 111, no. 12, Sep. 18, 1989, Columbus, Ohio, US, abstract no. 102002e), where a rapid hardening cement composition is described to which there had been added a mixture comprising 1. calinated aluminum sulfate and 2. basic aluminum sulfate.

Also in the French patent 2 031 950 there is disclosed a setting accelerator for mixtures which contain hydraulic binders and which setting accelerator consists of aluminum sulfate or contains aluminum sulfate (see claim 1) and also a mixture of aluminum sulfate+aluminates or derivatives thereof is disclosed through claim 4 of said French patent.

Aluminum sulfate which is free of crystal water however is not easily soluble in water, and therefore said sulfate does not result in the desired fast setting of the compositions which contain a hydraulic binder.

Inspite of the fact that many different set accelerating components and compositions are described in the prior art, said setting accelerators either are not able to provide a very rapid setting which is necessary for instance when the corresponding setting accelerator is added to spray concrete, or the setting accelerators described in the prior art provide a rapid development of strength of the concrete within the first period of setting, however then the final strength (e.g. the strength after 28 days of hardening) of the hardened concrete is lower than the final strength of a concrete which had been prepared without adding a setting accelerator.

The corresponding problems are specially severe if the setting of a spray concrete or gunite has to be improved. In this case it is necessary that in the sprayed mixture there is developed very fast a sufficient strength in order to ensure that the sprayed layer will adhere properly onto the surface to which the spray concrete had been applied. This is necessary in order to reduce the rebound. On the other hand it is of extreme importance that the strength of the concrete after the final setting of the mixture is not lower than the strength of a corresponding concrete which had been prepared without the addition of any set accelerating additive.

It now was surprisingly found out that the above mentioned problems can be solved by using as set accelerator a mixture which comprises an alkali free and chloride free set accelerator based on calcium aluminate, calcium sulfoaluminate and basic aluminum salts in combination with an easily water soluble sulfate of a polyvalent cation.

DESCRIPTION OF THE INVENTION

One object of the present invention is a process for accelerating the setting and hardening of a material which contains a hydraulic binder or which consists of a hydraulic binder by adding a setting accelerator which contains at least one component which is selected from the group consisting of calcium aluminate and/or calcium sulfoaluminate and/or a basic aluminum salt, which process is characterized in that the setting accelerator is a mixture which is free of alkali-metals and free of chlorides, and wherein said mixture comprises 1. at least one water soluble sulfate of a polyvalent cation, with the provision that if as water soluble sulfate there is used a product which contains aluminum sulfate, respectively consists of aluminum sulfate, said aluminum sulfate has to contain crystal water in order to provide the water solubility of said product and 2. a further constituent which is selected from the group which consists of calcium aluminate, calcium sulfoaluminate, basic aluminum salts which are free of alkali metal ions and mixtures consisting of two or more of said constituents or mixtures containing at least one of said constituents and at least one further component and wherein said setting accelerating, respectively hardening accelerating mixture is added in an amount of 0.1 to 10% by weight of said setting accelerating mixture, referred to the weight of the binder.

A further object of the present invention is a setting a hardening accelerator for accelerating the hardening of a material which contains a hydraulic binder or consists of a hydraulic binder and which setting accelerator is characterized in that it is a mixture which is free of alkali metals and chloride, and which mixture comprises the following components:

1. at least one water soluble sulfate of a polyvalent cation, which in the case of aluminum sulfate has to contain crystal water in order to provide the water solubility of said sulfate and 2. a constituent which is selected from the group consisting of calcium aluminates, calcium sulfoaluminates, basic aluminum salts which are free of alkali metal ions and mixtures containing at least two of said components or mixtures containing at least one of said constituents and at least one further component.

A still further object of the present invention is the use of a mixture which is free of alkali metals and chlorides and which mixture comprises the following components:

1. at least one water soluble sulfate of a polyvalent cation which in the case of aluminum sulfate has to contain crystal water in order to provide the water solubility of said sulfate and 2. a constituent which is selected from the group consisting of calcium aluminates, calcium sulfoaluminates, basic aluminum salts which are free of alkali metal ions and mixtures containing at least two of said components or mixtures containing at least one of said constituents and at least one further component as a setting a hardening accelerator for accelerating the setting and hardening of a material which contains a hydraulic binder or which consists of a hydraulic binder.

With the inventive process, respectively the inventive setting accelerators, respectively the use of said setting accelerators, any difficulties are avoided which occur if alkali metal ions are introduced into a mixture containing a hydraulic binder or a latent hydraulic binder. Furthermore, through the use of the inventive setting and hardening accelerators, respectively through the performance of the inventive process and the inventive use also all the difficulties as to the corrosion problem and the chemical resistance of a construction material are avoided which are caused through the incorporation of chloride ions.

The inventive process, respectively the inventive setting accelerators, are applicable to accelerate the hardening and setting of any kind of hydraulic or latent hydraulic binders and mixtures containing said binders, like e.g. hydraulic binders which are selected from the group consisting of cement, like Portland cement, lime, slaked lime, gypsum and mixtures containing at least two of said components.

If said setting accelerators are added to mixtures which contain a hydraulic binder, like mortar or concrete, then there is not only to be observed a fast development of the strength within the first minutes after adding said set accelerating mixture, but also the final strength of the construction material is far higher if compared with the final strength which results if setting accelerators described in the prior art are used instead of the inventive setting accelerating mixtures.

As already outlined before, many of the setting accelerators described in the prior art result in a fast development of a strength of the mixture containing the setting accelerator and a hydraulic binder, like concrete or mortar. However, after the final hardening of said mixtures there results a construction material which has a lower rigidity and lower strength than construction materials which are prepared without adding any setting accelerators.

Contrary to this, the incorporation of the inventive setting accelerators into a mixture which contains a hydraulic binder, like mortar or concrete, results in a final strength of the hardened material which is at least as high as the final strength of a corresponding hardened material to which no setting accelerator at all had been added, and usually even far better than the final strength of a hardened material which had been prepared without adding any setting accelerator. This can e.g. be seen from the compressive strength which is determined after a period of 28 days of hardening.

The inventive setting accelerating mixture, respectively the inventive process, is applicable and usable in many fields of application. For instance, said setting accelerating mixtures can be used in the production of prefabricated shaped bodies, like construction elements. In said field of application usually the hardening and setting is accelerated by heating the mixture (electrical heating, heating with oil burners or with water vapor). Such a heating operation causes additional costs for performing the heating procedure. Using the inventive setting accelerating mixtures the temperature is lower to which the mixture is heated in order to provide a further acceleration of the the setting, or the heating step can be completely omitted.

The inventive setting accelerators are also usable at the working site. In said field of application the range of time during which the construction material has to be supported is shortened drastically, i.e. the stripping time is shortened. Furthermore, through the use of the inventive setting and hardening accelerators the fast setting of the concrete or mortar can be also achieved at low environmental temperatures so that corresponding concrete mixtures can be also used for performing concreting procedures during wintertime.

A further field of application of the inventive set accelerating mixtures is the adding of said materials to mixtures which contain a hydraulic binder and which are used to fix or lock in their position any shaped bodies like prefabricated parts of concrete, cast shaped materials and so on.

Specially advantageous are the inventive accelerating mixtures if used in a shotcrete procedure, i.e. when spray mortar or spray concrete is produced. The inventive set accelerating mixtures can be used for performing a dry shotcreting procedure and for performing a wet shotcreting procedure. Through the incorporation of the inventive set accelerating mixtures into the spray concrete, a drastical reduction of the rebound and a very fast development of strength is achieved and also the final compressive strength is essentially improved.

Shotcreting procedures are used for providing linings and reinforcing layers when underground constructions are made or when naturally occurring or man-made cavities are to be provided with a reinforcing layer, e.g. when tunnels, galleries and pipes are made, for example in the field of mining.

The inventive set accelerating mixtures are furthermore very advantageous if a hydraulic binder or a mixture containing a hydraulic binder is used for solidifying or stabilizing or consolidating natural ground, like rocks, slopes or excavations, building ground and foundation soil.

Further advantages of the inventive setting accelerating mixtures are that through their addition to a mixture which contains a hydraulic binder the shrinkage during the setting procedure is not increased and accordingly the incorporation of said setting accelerating mixtures does not result in the development of cracks in the finally hardened construction materials. Furthermore, said setting accelerators do not incorporate into the mortar or the concrete any component which can be eluted from the finally hardened construction material through water of the environment.

Therefore, the chemical resistance and the durability of any construction materials which were made using the inventive setting accelerators are excellent.

Those setting accelerators described in the prior art which were free of alkali metal cations, furthermore were produced using rather expensive raw materials. Contrary to this the inventive setting accelerators are mixtures of raw materials which are far cheaper and therefore using said setting accelerators also economical advantages are achieved.

Usually already small quantities of the inventive set accelerating mixtures cause a fast setting and hardening of the hydraulic binder, respectively the mixture which contains the hydraulic binder. Usually, per 100 parts by weight of the hydraulic binder there are added only 2 to 10 parts by weight of the inventive set accelerating mixtures, in practice about 3 to 7 parts by weight only. Also because of said low dosages in which said setting accelerator develops its accelerating activity, costs are saved and economical advantages achieved.

If in the inventive setting accelerators there is used as component (2) a calcium aluminate, then preferred calcium aluminates are selected from the group consisting of calcium aluminates which correspond to the following formula:

$$CA, C_3A, CA_2 \text{ and } C_{12}A_7$$

or mixtures thereof or mixtures which contain at least one calcium aluminate selected from the above stated group of calcium aluminates and at least one further component. In said formulae the symbols C and A have the usual meaning, i.e.

C indicates CaO and

A indicates $Al_2O_3$.

Provided that the component (2) of the inventive setting and hardening accelerators is a water-free calcium sulfoaluminate then preferred of said products are those which correspond to the following formula:

$$C_4A_3\bar{s}$$

or the component (2) is a mixture which contains a water-free calcium sulfoaluminate which corresponds to the above stated formula and at least one further component.

In said formula C and A have the meaning indicated above and $\bar{s}$ is $SO_3$.

According to a preferred embodiment of the component (2) which is based on water-free calcium sulfoaluminate, said component is a mixture which contains at least 50% by weight of a water-free calciumsulfoaluminate which corresponds to the formula $C_4A_3\bar{s}$ and a further component which is selected from the group consisting of calciumaluminates, calcium silicates, calciumaluminoferrites and mixtures thereof.

If the component (2) of the inventive set accelerating mixtures, respectively the corresponding mixtures used for performing the inventive process is a basic aluminum salt which is free of alkalimetal ions, then this product is preferably selected from the group consisting of basic sulfates, nitrates, carbonates and mixtures of at least two of said components, or the component (2) is a mixture which contains a basic aluminum salt which is selected from the above stated group and at least one further component.

In the inventive set accelerating and hardening accelerating mixtures, respectively the corresponding mixtures used for the performance of the inventive process, the component (1) is preferably selected from the group consisting of water soluble aluminumsulfates which comprise per mole of $Al_2(SO_4)_3$ at least six moles of water and sulfates of the cation $Fe^{2+}$ and $Fe^{3+}$ which iron ions containing sulfates preferably contain crystal water and mixtures of at least two of said components or mixtures which contain at least one constituent selected from the above stated group and at least one further component. Preferably, in the inventive setting and hardening accelerator mixtures, components (1) comprises crystals water containing aluminumsulfates which contain, per mole of $Al_2(SO_4)_3$, six moles, twelve moles, fourteen moles, or eighteen moles of crystals water.

According to a preferred embodiment of the invention the setting and hardening accelerating mixtures, respectively the mixtures used for performing the inventive process, contain up to 90% by weight, referred to the weight of said mixture of the sulfate of component (1) and at least 10% by weight, referred to the weight of the mixture of the aluminum containing material of component (2).

In preferred setting accelerating mixtures the molar ratio of $Al_2O_3$ to $SO_4^{2-}$ is in the range of 1:0.1 to 1:10.

In further preferred set accelerating mixtures used for performing the inventive process the component (1) contains at least 30% by weight of $SO_4^{2-}$ and the component (2) has an aluminum content, calculated as $Al_2O_3$, of at least 18% by weight.

The inventive setting accelerating mixtures can be added in the form of a powder, dispersed in water or a non aqueous solvent or as aqueous solution. Optionally, the liquid contains furthermore a dispersing agent and preferred dispersing agents are selected from the group consisting of polyacrylic acid, polyacrylates, derivatives of phosphonic acids and mixtures containing two or more of said components.

When the inventive process is performed using a powderous set accelerating mixture, then said mixture can be added to a dry material which consists of the inorganic binder or contains the inorganic binder. It is furthermore also possible to use a premixture of the set accelerating mixture and the hydraulic binder. It is furthermore also possible to use a setting accelerator wherein the mixture comprises a further component selected from the group consisting of dispersing agents, inorganic binders, aggregates, water reducing agents, high range water reducing agents, air entraining agents, air detraining agents, and mixtures thereof.

When the inventive set accelerating mixture is in the form of a powder, it is also possible to add said mixture already to a material which consists of the hydraulic binder or contains a hydraulic binder and further dry components and to pack and ship said premixture. Optionally said premixture can be prepared in the industrial plant where the hydraulic binder is made.

According to a preferred embodiment of the inventive process the set accelerating and hardening accelerating mixture is added in a process where spray mortar or spray concrete, for example gunite, is prepared according to the dry spray procedure or the wet spray procedure.

When such a spray concrete is made it is possible to add the inventive set accelerating mixtures to the dry mixture which contains the hydraulic binder. Such an embodiment is advantageous if the inventive set accelerating mixture is itself a corresponding dry mixture.

When a spray concrete or spray mortar is prepared, it is furthermore possible to add the inventive set accelerating mixture to the water containing composition or concrete which contains the hydraulic binder and furthermore the water. Optionally, the corresponding incorporation of the setting accelerating mixture can be already performed in the company where said mixture is made or the incorporation is performed at the building site. For instance the inventive set accelerating mixture can be introduced into the mixture to be sprayed at any stage of the shotcreting procedure, e.g. added in the mixing unit, in the pump which transports the mixture, in the line where the mixture is transported, in the pre-wettening nozzle or in the spray nozzle or together with the air used for spraying, or together with the water which is used for making the mixture to be sprayed, e.g. together with the water added in the spray nozzle when a dry shotcreting procedure is performed.

The adding of the set accelerating mixture is preferably performed using a dosing unit which is suited for introducing predetermined amounts of a corresponding dry or wet setting accelerating mixture.

If the inventive mixtures are dispersions in water or an organic solvent then the corresponding dispersions can comprise up to 80% by weight, referred to the total weight of said dispersions, of solid materials provided that the corresponding dispersions contain furthermore a dispersing agent. Preferred dispersing agents are polyacrylic acids, copolymers which comprise acrylic acid as monomeric constituent and derivatives of the phosphonic acid.

The inventive mixtures and the inventive process will now be further illustrated through non limitative examples.

In the following examples 1, 2 and 3, the set accelerating activity of the inventive mixtures of set accelerators was tested. The corresponding tested mixtures comprise the following materials in the following amounts:

| Material | Amount in kg. |
| --- | --- |
| Portland cement, type I | 1.000 |
| sand 0–2 mm | 3.000 |
| water | 0.550 |
| concrete superplasticizer | 0.008 |
| setting accelerator | 0.060 |

The samples were tested with a penetrometer, i.e. a corresponding product of the company RMU (Italia). The initial set and the final set were determined using a needle of 2 mm at a penetration resistance of 600 g and 2200 g respectively.

EXAMPLE 1

(a) Test for comparison

The setting accelerator was a mixture of calciumaluminates and it was used in the above stated amount (0.060 kg) in the above stated test composition. Using said setting accelerator according to the prior art, the initial set and the end of the final set was more than 120 minutes.

(b) Testing of an inventive setting accelerating mixture

The test was performed in an analogous way, however now there was used a setting accelerating mixture consisting of 60 parts by weight of the mixture of the calciumaluminates and 40 parts by weight of $Al_2(SO_4)_3 \cdot 6 H_2O$. The use of 0.060 kg of said inventive mixture resulted in an initial set of only 30 minutes and in a final set of only 65 minutes.

EXAMPLE 2

Test for comparison

The tested setting accelerator consisted of calcium sulfoaluminate and it was used in an amount of 0.060 kg in the above stated mixture. With said setting accelerator the initial set was 63 minutes, and the final set 76 minutes.

(b) Testing of an inventive setting accelerating mixture

In the present test a mixture of 35 parts by weight of the calciumsulfoaluminate and 65 parts by weight of $Al_2(SO_4)_3 \cdot 6 H_2O$ was used as setting accelerator in an amount of 0.060 kg in the above stated mixture. Thereby an initial set of only 11 minutes and a final set of only minutes was determined.

EXAMPLE 3

(a) Test for comparison

In the present test the setting accelerator was basic aluminumsulfate and it was used in the same amount as stated in examples 1 and 2. With said mixture for comparison an initial set of 12 minutes and a final set of 27 minutes was determined.

(b) Testing of an inventive setting accelerating mixture

In the present test there was used a setting accelerating mixture which consisted of 50 parts by weight of the basic aluminumsulfate and 50 parts by weight of $Al_2(SO_4)_3 \cdot 6 H_2O$. Also said inventive mixture was used in an amount of 0.060 kg in the above stated test composition. With said inventive mixture an initial set of 7 minutes and a final set of 14 minutes was determined.

Examples for setting acceleration in spray mortar

In the following examples 4, 5, 6, 7 and 8 the setting accelerating effect of a setting accelerator according to the prior art (see example 4), and inventive setting accelerating mixtures (see examples 5, 6, 7 and 8) was tested.

In all the tests the spray concrete was sprayed according to the dry spraying procedure, and thereby in the test for comparison no $FeSO_4$ was added to the dry mixture and in the inventive example 0.5%, respectively 1%, respectively 2%, respectively 3% of $FeSO_4$, referred to the weight of the cement, were added to the dry mixture.

In the examples for comparison and in the inventive examples at the spray nozzle there was furthermore added to the water used for spraying the concrete a slurry of basic aluminumsulfate.

The slurry which was introduced at the spray nozzle contains 35% by weight, referred to the weight of said slurry of basic aluminum sulphate and furthermore a polyacrylate (as dispersing agent) as well as thickening agents and preservatives to stabilize the corresponding set accelerating slurry.

In all the examples the slurry was added in an amount of 7.7% by weight, referred to the weight of the Portland cement.

In all the tested mixtures the water to cement ratio was in the range of 0.55 to 0.60. The dry mixture was transported to the spray nozzle using an apparatus for dry shotcreting, i.e. the type Aliva 246 Vario. In the used apparatus the rotor had a volume of 2.0 liters and the hose with which the mixture was transported to the spray nozzle had a length of 20 m and its inner diameter was 46 mm. In all examples the spraying was performed using a usual spray nozzle made of vulcolan (Standartvulkolandüse), and the dosing of the slurry of aluminumsulfate was performed in said spray nozzle.

The tested dry mortar had the following composition:

30% by weight of Portland cement, type I

70% by weight of sand 0–1.2 mm.

The compressive strengths of the sprayed layer was determined one day after the spraying, two days after the spraying as well as seven days after the spraying. For the determination of the compressive strength from the sprayed layer there were drilled cores which had a diameter of 50 mm and a length of 50 mm.

The penetration resistance of the sprayed layer of spray mortar was determined 25 minutes after the spraying, 60 minutes after the spraying and 120 minutes after the spraying. The penetration resistance was determined using a microprocessor (Force Gauge-microprocessor of the company Mecmesin Ltd.).

| Examples: | 4 | 5 | 6 | 7 | 8 |
| --- | --- | --- | --- | --- | --- |
| dosage of the $FeSO_4$ in % referred to the weight of cement | 0 | 0.5 | 1 | 2 | 3 |
| Penetration resistance in Newton after | | | | | |
| 25 min | 80 | 110 | 160 | 380 | 360 |
| 60 min | 130 | 160 | 240 | 390 | 410 |
| 120 min | 150 | 240 | 310 | 420 | 450 |
| Compressive strength in MPa after | | | | | |
| 1 day | 0.5 | 0.9 | 1.6 | 2.9 | 7.3 |
| 2 days | 5.0 | 11.9 | 16.2 | 19.6 | 21.8 |
| 7 days | 26 | 27 | 31 | 29 | 33 |

From the test results which are stated in the above table the unexpected advantages of the inventive mixtures which contain a basic aluminumsulfate plus iron sulfate over the use of a set accelerator which only consists of the aluminumsulfate can be seen. If the test results of the example 4, i.e. the example for comparison, are compared with test results of the inventive examples, then there can be seen that with the inventive set accelerating mixture the rigidity of the applied layer is far higher soon after the application of the layer of spray mortar. For instance, the penetration resistance of the test for comparison according to example 4 is 80 Newton after 25 minutes, while according to the inventive example, said penetration resistance is 160 Newton if the setting accelerating mixture furthermore contains iron sulfate in an amount of 1%, referred to the cement, and even 360 Newton, if the set accelerating mixture contains 3% of iron sulfate, referred to t e weight of cement. Said results, accordingly, demonstrate that using the inventive set accelerating mixture the sprayed layer of spray concrete gains very fast a high strength.

Still more surprising, however, are the results which were achieved after the spray concrete had already set for seven days. Contrary to the setting accelerators described in the prior art which usually yield no good final strength provided that the initial set is very fast, the above stated table shows that all the inventive examples had a better final strength after seven days than the corresponding layers of example 4. With the inventive set accelerating mixtures, accordingly, a fast gaining of a high strength can be achieved, and after seven days of hardening the compressive strength is excellent.

TESTING OF THE FINAL STRENGTH OF THE CONSTRUCTION MATERIAL

In the following example the unexpected advantages of the inventive set accelerating mixtures over prior art set accelerators is demonstrated by testing the final strength of the hardened layer of spray concrete, i.e. the strength after 28 days. The spray concrete was applied according to the dry shotcreting procedure, and the concrete mixture used in the following examples 9, 10 and 11 had the following composition:

350 kg of Portland cement, type I
1450 kg of aggregate (0–8 mm)
water to cement ratio in the range of 0.55–0.59.

In example 9 and in example 10 the accelerator was added to the concrete using a dosing unit for powderous material. The concrete was transported to the spray nozzle using an apparatus which is suited for the wet spraying technique and the dry spraying technique as well, and the type 285 of a corresponding apparatus of the company Aliva was used, i.e. the apparatus with the designation "Aliva Duplo Nass- und Trockenspritzmaschine Typ 285". The mixture was transported through a hose having a length of 30 m and an inner diameter of 55 mm. The spraying was performed using a standard spray nozzle made of vulcolan.

The compressive strength was determined one day after the application of the layer of spray concrete according to the method which had been developed by Prof. Dr. W. Lukas and Dr. W. Kusterle, at the University of Innsbruck, Austria. Said determination of the compressive strength after one day of application was made using a stud driver, i.e. the corresponding apparatus of the company Hilti with the designation "Hilti Bolzensetzgerät".

For the determination of the compressive strength after seven days and after 28 days there were sawed from the applied layer of spray concrete prisms having the dimensions 4 cm×4 cm×16 cm.

EXAMPLE 9

(example for comparison)
In said example as setting accelerator there was added a powderous setting accelerator which is available in the market and which is a mixture containing sodiumaluminate and sodiumcarbonate. The corresponding setting accelerator was added in an amount of 4.6% by weight, referred to the weight of the cement in the concrete composition described above.

The compressive resistance of the corresponding concrete, stated in MPa after one day, seven days and 28 days was as follows:

| 1 day | >15 MPa |
| 7 days | 19.7 MPa |
| 28 days | 27.2 MPa |

EXAMPLE 10

(inventive set accelerating mixture)
The used setting accelerator was a powderous mixture which contains the following constituents:

30% by weight of calciumaluminate
40% by weight of basic aluminumsulfate and
30% by weight of $Al_2(SO_4)_3 \cdot 6\ H_2O$.

Said setting accelerating mixture was added in an amount of 4.1% by weight, referred to the weight of the Portland cement in the above stated concrete composition.

The results of the compressive strength which were determined after one day, seven days and 28 days of hardening are stated in the following table in MPa:

| 1 day | >15 MPa |
| 7 days | 24.0 MPa |
| 28 days | 38.3 MPa |

EXAMPLE 11

(example for comparison).
In the present example a setting accelerating mixture was tested which contains 10 parts by weight of a basic aluminumsulfate and 5.7 parts by weight of water-free aluminumsulfate.

As basic aluminumsulfate there was used an analogous product as the one described in the preceding example 10.

A corresponding dry powderous set accelerating mixture was added in an amount of 4.1% by weight, referred to the weight of the cement. The compressive strength determined after one day, seven days and 28 days of hardening were tested and the corresponding results are stated in the following table:

| 1 day | 11.5 MPa |
| 7 days | 21.0 MPa |
| 28 days | 30.0 MPa. |

From said test results there can be seen that surprisingly the powderous mixture which contains water-free aluminumsulfate instead of an aluminumsulfate which contains crystal water yields a finally hardened layer of spray concrete which has a far lower early and final strength than a corresponding layer of spray concrete which had been prepared using a mixture which contains a crystal water containing aluminumsulfate. The reason is a slower solubility of the aluminumsulfate.

Testing of the elution of components of the concrete

From the spray concrete layers which had been prepared according to the preceding example 9 and the preceding example 10, cores were drilled. Said cores had a diameter of 95 mm. Of the corresponding cores disks were cut off and said disks had a thickness of 10 mm. 28 days after the hardening the quantity of material which could be eluted from said test disks was determined. Said tests were performed according to the method which had been developed at the Technical University of Munich, Institute for Building-Engineering, by the group of Prof. Dr. R. Springenschmid.

EXAMPLE 12

(example for comparison)

The layer which had been prepared according to the preceding example 9 gave a concentrated eluted material which contained the following components in the stated amounts of mg/l:

| | |
|---|---|
| $Na^+$ | 80.9 mg/l |
| $SO_4^-$ | 2.1 mg/l |
| $Ca^{++}$ | 132.8 mg/l. |

EXAMPLE 13

The corresponding disks were tested which were cut out of the cores which had been prepared according to the preceding example 10:

The eluted material contained the constituents stated in the following amounts, stated in mg/l:

| | |
|---|---|
| $Na^+$ | 17.6 mg/l |
| $SO_4^-$ | 1.3 mg/l |
| $Ca^{++}$ | 86.3 mg/l. |

From said test results there can be seen that using the inventive set accelerating mixture from the finally hardened concrete far less ionic constituents are eluted than from a corresponding concrete which had been set accelerated using a product based on sodiumaluminate and sodiumcarbonate. It is of great importance that from a finally hardened concrete not too great quantities of calcium ions are eluted. Calcium ions which migrate from the concrete into the water of the environment may cause problems, when they are precipitated from the corresponding aqueous solution, e.g. due to a change of the pH value of said solution after it had been in contact with the soil. Said precipitation may result in blockages of lines, pipes and so on.

We claim:

1. A process for accelerating the setting and hardening of a material which comprises a hydraulic binder by adding a setting accelerator comprising at least one component selected from the group consisting of calcium aluminate, calcium sulfoaluminate and a basic aluminum salt, wherein the setting accelerator is a mixture free of alkali metals and free of chlorides, and comprises (i) a material comprising at least one water soluble sulfate of a polyvalent cation, with the proviso that if as water soluble sulfate there is used an aluminum sulfate, said aluminum sulfate contains crystal water to provide the water solubility of said material and (ii) a constituent comprising a member selected from the group consisting of calcium aluminate, calcium sulfoaluminate, basic aluminum salts which are free of alkali metal ions, and mixtures thereof, and wherein the setting acceleration and hardening acceleration mixture is added in an amount of 0.1 to 10% by weight based on the weight of the binder.

2. A process according to claim 1, wherein component (ii) is a calcium aluminate selected from the group consisting of those calcium aluminates corresponding to the following formula:

$CA, C_3A, CA_2$ and $C_{12}A_7$ or mixtures thereof.

3. A process according to claim 1, wherein component (ii) is a water-free calcium sulfoaluminate which corresponds to the following formula:

$C_4A_3s$ or the component (ii) is a mixture which contains a water-free calcium sulfoaluminate.

4. A process according to claim 3, wherein component (ii) is a mixture comprising at least 50% by weight of a water-free calcium-sulfoaluminate which corresponds to the formula $C_4A_3s$ and a further component selected from the group consisting of calcium-aluminates, calcium silicates, calcium-aluminoferrites, and mixtures thereof.

5. A process according to 1, wherein component (ii) comprises basic aluminum salt free of alkalimetal ions and selected from the group consisting of basic sulfates, nitrates, carbonates, and mixtures thereof.

6. A process according to 1, wherein component (i) comprises a member selected from the group consisting of water soluble aluminum sulfates which comprise, per mole of $Al_2(SO_4)_3$, least six moles of water and sulfates of the cation $Fe^{2+}$ and $Fe^{3+}$, wherein the iron ion containing sulfates are free of crystal water, or contain crystal water, and mixtures thereof.

7. A process according to claim 1, wherein the setting and hardening accelerating mixture comprises up to 90% by weight, based on the weight of said mixture of the sulfate of component (i) and at least 10% by weight, based on the weight of the mixture of the aluminum containing material of component (ii).

8. A process according to claim 1, wherein the setting accelerating mixture the molar ratio of $Al_2O_3$ to $SO_4^{2-}$ is in the range of 1:0.1 to 1:10.

9. A process according to claim 1, wherein component (ii) contains at least 30% by weight of $SO_4^{2-}$ and component (ii) has an aluminum content, calculated as $Al_2O_3$, of at least 18% by weight.

10. A process according to claim 1, wherein the setting accelerating mixture is added in the form of a powder, dispersed in water or a non-aqueous solvent, or as an aqueous solution.

11. A process according to claim 1, wherein the mixture further comprises a dispersing agent.

12. A process according to claim 11, wherein said dispersing agent is preferably selected from the group consisting of polyacrylic acid, polyacrylates, derivatives of phosphonic acid and mixtures thereof.

13. A process according to claim 1, wherein a powderous set accelerating mixture is added to a dry material which comprises the inorganic binder, or a premixture of the set accelerating mixture and the hydraulic binder is used.

14. A process according to claim 1, wherein the set accelerating mixture is in the form of a dry powder and is added to a material which comprises the hydraulic binder, and optionally further dry components, to form a premixture effective for packaging and shipping.

15. A process according to claim 1, wherein the set accelerating mixture is added to a material which contains a binder selected from the group consisting of cement, lime, slaked lime, gypsum and mixtures thereof.

16. A process according to claim 1, wherein the set accelerating and hardening accelerating mixture is added during a process for preparing spray mortar or spray concrete according to the dry spray procedure or the wet spray procedure.

17. A process according to claim 16, wherein the setting accelerating mixture is added to a dry mixture containing the hydraulic binder or to a water containing composition or concrete which contains a hydraulic binder and water, and wherein the incorporation of the setting accelerating mixture is performed where said mixture is made or at a building site, and wherein the set accelerating mixture is added using a dosing unit which is effective for introducing set amounts of a corresponding dry or wet setting accelerating mixture.

18. A setting and hardening accelerator for accelerating the hardening of a material which comprises a hydraulic binder, wherein the setting accelerator is a mixture free of alkali metals and chlorides, and comprises:

(i) a material comprising at least one water soluble sulfate of a polyvalent cation, with the proviso that if as a water soluble sulfate there is used an aluminum sulfate, said aluminum sulfate contains crystal water to provide the water solubility of said sulfate; and (ii) a constituent comprising a member selected from the group consisting of calcium aluminates, calcium sulfoaluminates, basic aluminum salts which are free of alkali metal ions, and mixtures thereof.

19. A setting and hardening accelerator according to claim 18, wherein component (i) comprises a member selected from the group consisting of aluminum sulfates of formula $Al_2(SO_4)_3$, which comprises crystal water, and sulfates of $Fe^{2+}$ and $Fe^{3+}$, wherein the iron sulfates are either free of water or comprise crystal water, and mixtures thereof.

20. An accelerator according to claim 19, comprising crystal water containing aluminum-sulfates which contain, per mole of $Al_2(SO_4)_3$, six moles, twelve moles, fourteen moles, or eighteen moles of crystal water.

21. A setting and hardening accelerator according to claim 18, wherein component (ii) comprises a member selected from the group consisting of calcium aluminates which correspond to the following formula CA, $C_3A$, $CA_2$ and $C_{12}A_7$, anhydric calcium sulfoaluminates of formula $C_4A_3s$ and basic aluminum salts which are sulfates, nitrates or carbonates and mixtures thereof.

22. A setting and hardening accelerator according to claim 21, wherein component (ii) comprises a mixture which contains at least 50% by weight, of a water-free calcium sulfoaluminate which corresponds to the formula $C_4A_3s$, and a constituent selected from the group consisting of calcium aluminates, calcium silicates and calcium aluminoferrites.

23. A setting and hardening accelerator according to claim 18, the accelerator comprises up to 90% by weight, based on the weight of said accelerator, of water soluble sulfate of component (i), and at least 10% by weight, based on the weight of the mixture, of the aluminum compound of component (ii).

24. A setting and hardening accelerator according to claim 18, said mixture of components (i) and (ii) having a molar ratio of $Al_2O_3$ to $SO_4^2$ in the range of 0.1:1 to 10:1.

25. A setting and hardening accelerator according to claim 18, said accelerator being a powder, or dispersed in water or a nonaqueous solvent, or dissolved in water.

26. A setting and hardening accelerator according to claim 18, said mixture comprising a further component selected from the group consisting of dispersing agents, inorganic binders, aggregates, water reducing agents, high range water reducing agents, air entraining agents, air detraining agents, and mixtures thereof.

* * * * *